United States Patent [19]

Norton et al.

[11] 4,078,451

[45] Mar. 14, 1978

[54] MACHINE TOOL GUARDS

[76] Inventors: Hubert Veare Norton; Leslie Buckingham Norton; Douglas Edwin Norton, all of "Bancroft", Plough Road, Horley, Surrey, England

[21] Appl. No.: 747,346

[22] Filed: Dec. 3, 1976

[30] Foreign Application Priority Data

Dec. 1, 1975 United Kingdom ............... 49299/75

[51] Int. Cl.² .......................... F16P 1/00; G05G 25/00
[52] U.S. Cl. ...................................................... 74/613
[58] Field of Search .......................................... 74/613

[56] References Cited

U.S. PATENT DOCUMENTS 3,464,291  9/1969  Lindquist et al. ..................... 74/613

Primary Examiner—Leonard H. Gerin
Attorney, Agent, or Firm—Watson, Cole, Grindle & Watson

[57] ABSTRACT

A machine tool, such as a hydraulic press, has a movable guard to prevent the operator's hands from being present in the vicinity of the powered operating element, such as a press tool, while the machine is operating. The guard can be actuated automatically or manually by the operator and is connected to a dump valve in the hydraulic system so that power cannot be applied to the operating element at any time except when the guard is fully closed.

10 Claims, 2 Drawing Figures

MACHINE TOOL GUARDS

BACKGROUND OF THE INVENTION

This invention relates to machine tools of the kind having a working space in which powered operations are carried out by a power-driven movable element on workpieces, and having means designed to minimise the risk of injury to the operator by preventing his hands being present in the working space during the periods of time when the powered operations are in progress.

Such protective means have taken various forms. For instance, there may be two machine control buttons spaced apart so that they cannot both be reached by the same hand of the operator, and both of which must be pressed by the operator to initiate a working operation and kept pressed throughout the operation, so that the operator's two hands must both be occupied well clear of the working space throughout the working operation. Such protective means have the disadvantage that the operator is not free until after the completion of each operation to perform other tasks such as getting the next workpiece ready for placing in the working space.

In other protective means a movable guard is provided for the working space, which is actuated automatically by the machine so that it is moved to close off the working space before the working operation begins. Such guards often are arranged to move in such a way as to push the operator's hand or hands out of the working space. Such guards are not wholly reliable and occasionally an operator's hand may become trapped and accidental injury may ensue. Further, as such guards must be actuated with sufficient force to push the operator's hands away, the closure of the guard itself may sometimes cause an injury. Also, as their operation is closely tied in with the working operations of the machine, they are not amenable to independent actuation by the operator.

OBJECTS OF THE INVENTION

It is an object of the invention to provide protective means for a machine tool which prevent the operator's hands being present in the working space during a working operation but leave him free to perform other tasks during the working operation, such as preparing another workpiece for the next working operation.

A further object is to provide a movable guard for the working space which is closable automatically by a light force so that the guard itself cannot injure even a careless operator.

Another object is to provide means for ensuring that the machine cannot perform a working operation until the guard is fully closed.

Yet another object is to provide flexibility of operation of the machine, e.g. for performing successive operations either automatically or under operator control, with effective guarding of the working space under all modes of operation.

A yet further object is to afford over-riding control of the machine by the operator for a variety of modes of operation while maintaining effective protection for the operator in all these modes.

Other and further objects of the invention will become apparent from the following description of a preferred embodiment which is illustrated in the accompanying drawings.

SUMMARY OF THE INVENTION

According to the invention, in a machine tool having a power-driven operating element, a power supply for said operating element, a working space in which operations are carried out by said operating element on workpieces, and a movable guard to close off the operator's access to the working space while the operations are being carried out but to permit access at other times, for instance, to enable the operator to insert and remove workpieces, there is a guard actuator arranged to close the guard automatically, and the guard itself is interconnected with said power supply so that the machine can operate only when the guard is fully closed.

This is in contrast to prior art arrangements where there is an interconnection between the operating parts of the machine and means for actuating the guard, and wherein it is the operation of the machine that causes the guard to close. In the present invention it is the closure of the guard itself that allows power to reach the operating element. Thus the position of the guard is paramount in determining whether or not the machine can perform a working operation.

If the guard meets an obstruction, e.g. if the operator's hand is still in the working space, it cannot close and so the machine will not operate.

The guard actuator may be arranged to cause the guard to re-open fully if checked before it is fully closed.

The guard may also be manually operated, overriding the actuator, but owing to inconnection being between the guard itself and the power supply rather than between operating parts of the machine and the guard actuator, the machine can still only operate while the guard is fully closed, irrespective of whether the guard is operated manually or by the guard actuator.

The guard actuator may be operable by the operator, to initiate closure of the guard and start the working cycle of the machine. Alternatively, or in addition, the guard actuator may be operable automatically for repetitive working cycles.

The guard actuator may include an adjustable timer for setting the duration of the working cycle, e.g. to hold the guard open for a period of time sufficient to enable the operator to remove and replace a workpiece in the working space before the guard actuator begins to close the guard again automatically.

The invention is more particularly, but not exclusively, applicable to power presses, especially hydraulic presses, and will be described with particular reference to a preferred embodiment which is an hydraulic press, although it should be borne in mind that the invention is also applicable to machine tools of other types.

DESCRIPTION OF THE PREFERRED EMBODIMENT

Figure 1:
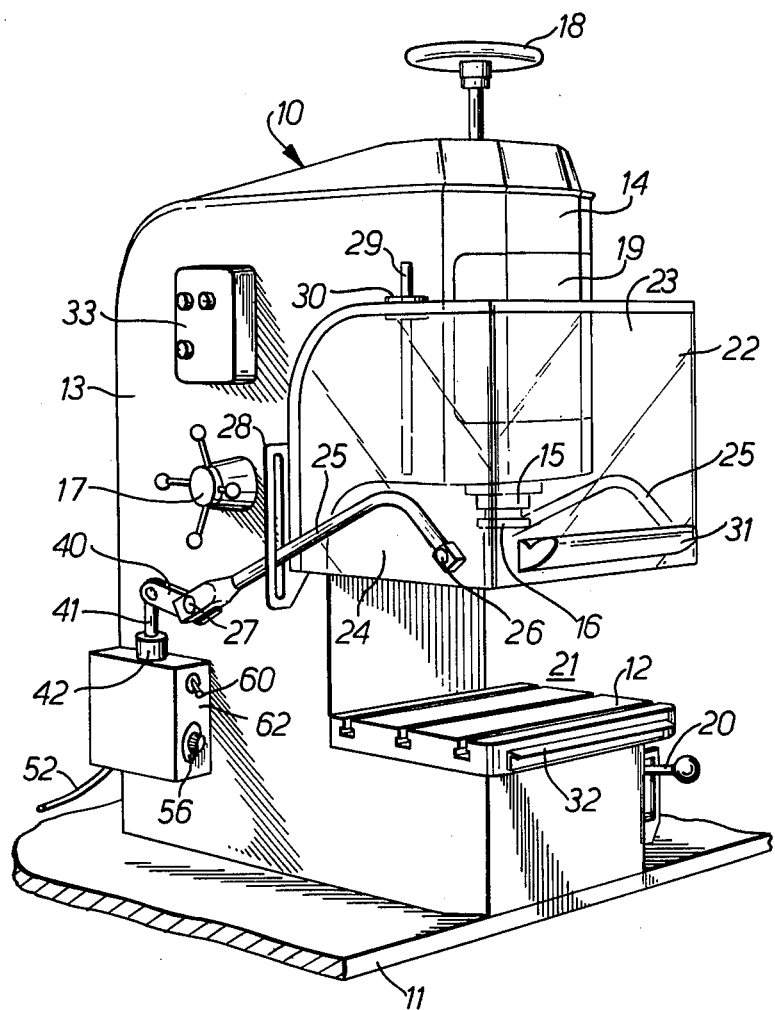
FIG. 1 is a perspective view of the preferred hydraulic press embodiment of the invention.

The hydraulic press 10 shown in FIG. 1 is for the most part of known construction and, except for the operation of the guard, works in a known manner. The press 10 is mounted on a bench or table top 11 only a portion of which is shown. The press comprises a bed 12 for supporting a workpiece (not shown), a frame or body 13 extending upwardly behind the bed 12, and a head 14 projecting forwardly from the frame or body 13 over the bed 12. In the head is mounted an hydraulic cylinder and piston assembly including a vertically movable element 15 having at its lower end means 16 for attachment of the movable part of a press tool (not shown). Another part of the press tool (also not shown) is fixed to the bed 12 in vertical alignment with the movable part so that when the element 15 is in a raised position a workpiece can be inserted between the movable and fixed parts of the press tool. When hydraulic pressure is applied to the cylinder and piston assembly the element 15 is forced downwardly to bring the movable part of the press tool into contact with the work piece and, in cooperation with the fixed part of the press tool, perform the pressing operation. The element 15 is then raised again, also by hydraulic pressure, to release the work piece on which the pressing operation has been performed and to enable a further work piece (or a further portion of the same work piece where successive operations have to be performed upon it) to be correctly positioned between the two parts of the press tool.

Stops for determining the end positions of the movable element 15 are provided, the top stop being adjustable by a hand wheel 18 and the bottom stop being adjustable by means of a threaded collar on the element 15 accessible behind a detachable panel 19 of the head 14.

In a known manner the press can be programmed to operate in a number of different modes, e.g. single cycle, automatically repeating cycles, vibratory stroking, or with variable dwell. A program setting valve 17 is provided to enable the appropriate operating program to be selected by the operator.

A manual control lever 20 enables the operator to start and stop the selected program.

Figure 2:
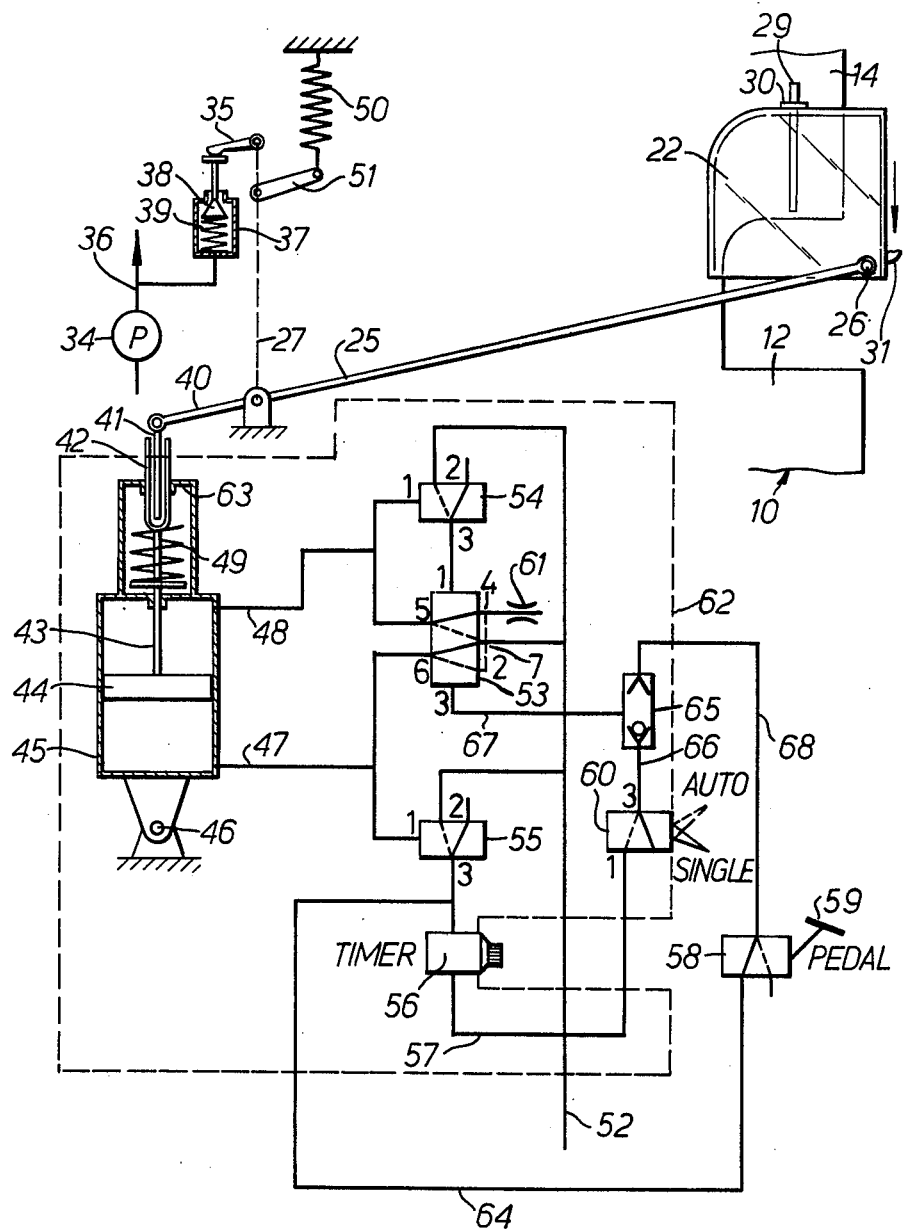
FIG. 2 is a diagram illustrating the mechanism for actuating the guard.

The working space 21 between the bed 12 and the head 14, in which the pressing operations are carried out, must be guarded when the machine is working to ensure that the operator's hand or a finger cannot become trapped between the press tool parts and the work piece. For this purpose there is provided a vertically movable guard 22 (see also FIG. 2). This guard consists of a front panel 23 and two side panels 24 which, when the guard is lowered from the position shown in FIG. 1, enclose the working space 21. The panels are transparent so that the operator can supervise the pressing operation. A tough heat-resistant and oil-resistant transparent plastics material such as a polycarbonate is suitable. The guard is supported on a pair of arms 25 the front ends of which are attached to the side panels 24 by pivots 26 and the rear ends of which are keyed to a rotatable shaft 27 which extends horizontally through the frame or the body 13. The arms 25 pass through slotted guides 28 which are fixed to the guard 22, to provide lateral guidance for the guard 22. Fixed to the sides of the head 14 are vertical slides 29 engaged by guide elements 30 fixed to the top edges of the side panels 24 of the guard 22 so that the upper portion of the guard is constrained to move vertically as the guard is raised and lowered. Within the frame or body 13 a spring 50 (FIG. 2) acts on an arm 51 fixed to the shaft 27 to urge the guard 22 towards its raised position. A handle 31 near the lower edge of the front panel 23 of the guard enables the operator to raise and lower the guard manually if desired. Raising the guard from its lowest position stops the machine immediately, as will be described. A stop 32 is secured to the front edge of the bed 12 to define the lowest position of the guard, in which position the lower edges of the front and side panels 23 and 24 overlap the front and sides of the bed.

The machine is provided with an on/off switch box 33 fitted with indicator lights, for controlling the supply of electricity to an hydraulic pump 34 (FIG. 2) within the frame or body 13, which pump generates the hydraulic pressure for actuating the press.

Within the frame or body 13 an arm 35 (FIG. 2) is fixed to the rotatable shaft 27 on which the guard arms 25 are mounted. Connected to the delivery line 36 of the pump 34 is a dumping valve 37. The movable element 38 of this valve is urged towards a seating by a spring 39. When the dumping valve 37 is closed, hydraulic fluid is pumped under pressure through the delivery line 36 to the operative parts of the press, but when the valve is opened by the arm 35 depressing the movable element 38, hydraulic fluid is dumped from the delivery line 36, thereby relieving the pressure on the operative parts of the press and causing the press to stop immediately. The movable element 38 is depressed by the arm 35 in all angular positions of the shaft 27 except when the guard 22 is in its lowest position touching the stop 32 and completely enclosing the working space 21. Thus the press can only operate when the guard 22 is in its lowest position, and it will stop immediately the guard begins to be raised from this position. The dumping valve 37 is actuated through a direct mechanical connection (arm 35, shaft 27 and arms 25) with the guard itself, and can only be opened by the guard itself being fully lowered. Its operation is independent of whether the guard is moved automatically by the guard actuator or manually by the operator. This is an important safety factor, as the proper operation of the dump valve would not be affected should some fault develop in the guard actuator.

The guard actuator will now be described.

Keyed to the shaft 27 at one side of the machine is a short arm 40. The rear end of this arm is pivotally connected to a rod 41 which is slidable in a sleeve 42 at the upper end of the piston rod 43 of a pneumatic cylinder and piston assembly comprising a piston 44 in a cylinder 45. The cylinder is mounted at its lower end on a pivot 46 attached to the frame or body 13, so that it can accommodate the arcuate movements of the rear end of the arm 40. The arrangement is such that when the guard 22 is in its fully raised position with the arm 40 in its lowest position, the piston 44 is at the bottom of the cylinder 45. When compressed air is admitted to the space below the piston 44 through a line 47 in a manner to be described, the piston 44, the piston rod 43 and the sleeve 42 rise. The lower end of the sleeve 42 engages the lower end of the rod 41 and rotates the arm 40, the shaft 27 and the guard arms 25 and so lowers the guard 22 automatically against the force of the spring 50. When the piston 44 is in a raised position and compressed air is supplied to the space above it through a line 48, the piston 44, the piston rod 43 and the sleeve 42 descend and allow the spring 50 to raise the guard automatically. The rod 41 and the sleeve 42 provide a lost motion device, enabling the cylinder and piston assembly to return to its retracted condition quickly without being delayed by the slower moving guard 22. Further, the lost motion device enables the operator himself to lower the guard without affecting the actuator. Also, the operator can raise the guard and so stop the machine at any time, the mechanical advantage afforded by the long guard arms 25 and the short arm 40, and the relatively low air pressure employed (e.g. 40–50 psi), enabling the operator to overpower the force exerted by the pneumatic cylinder and piston assembly. Thus the operator can at all times open or close the guard manually, overriding the actuator. Moreover, the dumping valve 37 will be held open so that the machine will stop, or will not be able to commence a working stroke, whenever the guard is not in its fully closed position, irrespective of whether the guard is actuated manually by the operator or automatically by the guard actuator.

A short spring 49 is supported on an abutment on the piston rod 43. After the piston 44 has started its upward movement free from restraint by the spring 49, the upper end of the spring comes up against an abutment 63 fixed to the cylinder 45 and is thereafter progressively compressed, applying an increasing restraint against the upward movement of the piston and the automatic downward movement of the guard 22. The purpose of this is to retard the automatic downward movement of the guard as it approaches the stop 32 so that it closes gently, without hindering the first part of its downward movement. Owing to the lost motion device 41, 42, the spring 49 is not operative when the guard is being lowered manually by the operator.

The pneumatic system is supplied with compressed air through a line 52 which leads to three pneumatic logic units, a flip-flop unit 53, a NOT unit 54 controlled by the pressure in the cylinder space above the piston 44 through the line 48 and a NOT unit 55 controlled by the pressure in the cylinder space below the piston 44 through the line 47.

The input signal port 1 of the NOT unit 54 is connected via the line 48 to the cylinder space above the piston 44, its port 2 is connected to the air line 52 and its port 3 is connected to the first input signal port 1 of the flip-flop unit 53. When there is an input pressure signal at the port 1 of the NOT unit 54 there is no connection between its ports 2 and 3 and so there is no input pressure signal at the port 1 of the flip-flop unit 53. When there is no input pressure signal at the port 1 of the NOT unit 54, then there is an input pressure signal at the port 1 of the flip-flop unit 53 from the air line 52 via the NOT unit 54.

The input signal port 1 of the NOT unit 55 is connected via the line 47 to the cylinder space below the piston 41, its port 2 is connected to the air line 52 and its port 3 is connected to the input port of an adjustable timer 56. When there is an input pressure signal at the port 1 of the NOT unit 55 there is no connection between its ports 2 and 3 and so there is no supply of air to the timer 56 or to a branch line 64 which leads to the input of an on-off valve 58 controlled by the operator by means of a pedal 59 located below the bench or table 11. When there is no input pressure signal at the port 1 of the NOT unit 55, then compressed air can flow to the timer 56 and to the on-off valve 58 from the air line 52 via the NOT unit 55.

When there is a supply of compressed air to the timer 56 via the NOT unit 55, the timer does not permit onward flow of this air until after the period of time to which the timer has been set has elapsed. As soon as that period has elapsed a valve in the timer opens, permitting the compressed air to flow through an output line 57 to the input port 1 of a selector valve 60. When the selector valve 60 is set to the AUTO position its input port 1 is connected to its output port 3, and when the valve in the timer opens, compressed air can pass through the selector valve 60 via a line 66 to one input of a shuttle valve 65 and thence via a line 67 to the second signal input port 3 of the flip-flop unit 53. When the selector valve 60 is set to the SINGLE position there is no communication between its input port 1 and its output port 3.

The output of the pedal-operated on-off valve 58 communicates with the other input of the shuttle valve 65 via a line 68. When the pedal 59 is depressed the valve 58 allows compressed air from the branch line 64 to pass to the shuttle valve and thence via the line 67 to the input port 3 of the flip-flop unit 53. The timer 56 and the selector valve 60 are connected in parallel with the pedal-operated valve 58 between the NOT unit 55 and the shuttle valve 65 leading to the input port 3 of the flip-flop unit 53, so that the timer 56 can be by-passed by the operator depressing the pedal 59.

The central port 7 of the flip-flop unit 53 is connected to the air line 52 while two side ports 5 and 6 are connected, respectively, to the line 48 communicating with the cylinder space above the piston 44, and to the line 47 communicating with the cylinder space below this piston. The two outer side ports 2 and 4 are connected together and have a common outlet to the atmosphere via a restrictor 61.

The pneumatic cylinder and piston assembly and the associated logic units can be accommodated in a box 62 (FIG. 1) fixed to one side of the machine frame or body 13. The items within the box are enclosed within the broken line in FIG. 2 which symbolically represents the box 62.

OPERATION

The operation is as follows. Assume the machine is to perform automatically a series of cycles in each of which the operator has to place a work piece in the working space 21, cause the press to perform one working stroke, remove the pressed work piece and replace it with another.

Having set up the machine the operator sets the appropriate program at the program setting valve 17 and sets the selector valve 60 to AUTO. The guard 22 is in the raised position with the piston 44 at the bottom of the cylinder 45. There is no input signal to either NOT unit 54 or 55 until the air supply comes on, when air pressure will pass from the line 52 through the NOT unit 54 to the input signal port 1 of the flip-flop unit 53, causing it to take up or remain in the dotted line condition, allowing air pressure to pass from the line line 52 to the space above the piston 44, via the flip-flop ports 7 and 5 and the line 48. The flip-flop unit remains in this condition until it receives an input pressure signal at its port 3, even though the signal at its port 1 ceases as soon as the air pressure in the line 48 closes the NOT unit 54. The operator sets the timer 56 to the period necessary for removing a finished work piece and replacing it with a new one, say 10 seconds. As there is as yet no pressure at the input signal port 1 of the other NOT unit 55, the timer 56 will receive air pressure from the line 52 via the NOT unit 55 and will start the cycle. The operator places a work piece in the working space 21 in the correct position on the fixed part of the press tool and then removes his hands from the working space. After the set period, say 10 seconds, the timer allows air to flow to the selector valve 60 and thence through the shuttle valve 65 to the lower input signal port 3 of the flip-flop unit. This changes the connections in that unit to the full line position, whereby the port 7 is placed in communication with the port 6, allowing air under pressure to enter the cylinder space below the piston 44 via the line 47. The pressure now present in the line 47 closes the NOT unit 55. Also, the cylinder space above the piston 44 is put in communication with the restrictor 61 via the flip-flop parts 5 and 4, allowing air in that space to escape through the restrictor so that the piston 44 rises and the guard 22 descends at a controlled rate. When the guard is almost in its lowest position the dumping valve 37 is allowed to close so that hydraulic pressure is applied to the pressing cylinder and the pressing operation is performed. With the guard 22 closed and the piston 44 stationary, the pressure in the cylinder space above the piston drops due to air escaping through the restrictor 61, and when the pressure has fallen to about 10% of the supply pressure in the line 52 the NOT unit 54 switches over to allow air pressure to pass from the line 52 to the input signal port 1 of the flip-flop unit, changing the flip-flop unit connections back to the dotted line condition whereby the cylinder space below the piston 44 is vented through the restrictor 61 and air pressure is applied to the cylinder space above the piston 44. The pneumatic cylinder and piston assembly thus quickly reverts to the retracted position with the piston 44 at the bottom of the cylinder 45, the lost motion device 41, 42 allowing the guard to rise in its own time under the action of the spring 50. The venting of the cylinder space below the piston 44 also causes the NOT unit 55 to switch over to restore the connection between the air line 52 and the timer 56 and so start the next cycle. While the guard 22 is raised the operator has time to remove the pressed work piece and insert another one.

During the period when the guard 22 is closed the pressing operation is initiated, performed and terminated automatically so the operator's hands are free to get the next work piece ready. This results in considerable savings of time and operator fatigue as compared to safety systems wherein the operator's hands must be engaged during the actual pressing operations in touching two control buttons or in holding a guard in a closed position. With such systems the preparation of the next work piece has to be done after the previous pressing operation instead of during that operation.

If, while the guard 22 is descending, an operator's hand or finger is still in the working space, for instance, if he has failed to position the work piece properly and is trying to correct it, or if the descent of the guard is otherwise interrupted, the dumping valve 37 will continue to be held open and the press will not operate. Moreover, the rising movement of the pneumatic piston 44 will also be checked, allowing the pressure in the space above it to drop below the threshold value at which the NOT unit 54 will switch over, thereby causing the flip-flop unit 53 to reverse its connections and cause the piston 44 to descend again, the guard 22 to rise, and the working cycle to restart. This gives the operator time to re-position the work piece.

If the time period set by the timer 56 is long, the delay before the working cycle is automatically restarted may be unacceptably long. In such a case, the operator can himself initiate the re-starting of the cycle, by depressing the pedal 59. This allows air to flow through the branch line 64, the line 68 and the shuttle valve 65 to the input part 3 of the flip-flop unit 53, by-passing the timer 56.

Similarly, the operator can stop the machine at any time merely by manually checking the descent of the guard 22, or by raising it from its fully closed position with the aid of the handle 31. He can do this even while the press element 15 is descending on its working stroke. This, too, has the effect of re-starting the working cycle. This capability of stopping and re-starting the cycle right up to the moment of pressing is valuable both in reducing the number of rejects and in reducing the risk of tool damage.

Switching the selector valve 60 from AUTO to SINGLE has the effect of cutting out the timer 56 and bringing the pedal-actuated valve 58 into play. In this condition the machine will not re-start after the completion of a single working cycle until the operator depresses the pedal 59, whereupon another single working cycle will be performed.

We claim:

1. A machine tool comprising a power supply, a movable power-driven operating element, an operative connection between said power supply and said operating element, inactivating means for inactivating said operative connection, a guard movable between a closed position defining a closed working space containing said operating element and an open position affording access to said working space, guard actuator means to move said guard between said positions, and interconnecting means between said guard and said inactivating means whereby said operative connection is inactivated whenever said guard is not in said closed position.

2. A machine tool according to claim 1 in which said guard actuator means is arranged to cause said guard to return to said open position if movement of said guard towards said closed position be checked before said guard reaches said closed position.

3. A machine tool according to claim 1 including manual operating means for said guard, said manual operating means being capable of over-riding said guard actuator means.

4. A machine tool according to claim 1 which also includes manual control means for said guard actuator means for effecting movement of said guard toward said closed position.

5. A machine tool as claimed in claim 1 in which said guard actuator means is operable automatically for repetitive working cycles.

6. A machine tool as claimed in claim 5 in which said guard actuator means includes adjustable timer means for setting the duration of said working cycles.

7. A machine tool as claimed in claim 6 including manual control means for said guard actuator means operative to over-ride said timer means.

8. A machine tool as claimed in claim 1 in which said guard actuator means comprises a pneumatic cylinder and piston assembly and a pneumatic control system, said system incorporating pneumatic logic devices to selectively supply air under pressure to opposite end spaces of said cylinder and piston assembly in dependence on air pressure prevailing in said end spaces.

9. A machine tool as claimed in claim 8 in which said pneumatic control system comprises two NOT logic units and a flip-flop logic unit, each of said NOT logic units being associated with a respective one of said cylinder end spaces and receiving input pressure signals from said respective end space, each said NOT unit being so arranged that when the input signal thereto is below a threshold value said NOT unit passes an input pressure signal to one end of said flip-flop logic unit which is so arranged that on receipt of said pressure input signal it switches over pressure air supply and discharge connections from one of said ends of said cylinder and piston assembly to the other of said ends and so reverses the direction of operation of said guard actuator means.

10. A machine tool as claimed in claim 9 including a lost motion device interposed between said cylinder and piston assembly and said guard to permit movement of said guard toward said closed position from a position determined by said cylinder and piston assembly.

* * * * *

UNITED STATES PATENT OFFICE
CERTIFICATE OF CORRECTION

PATENT NO. : 4,078,451
DATED : March 14, 1978
INVENTOR(S) : NORTON ET AL

It is certified that error appears in the above-identified patent and that said Letters Patent are hereby corrected as shown below:

Please cancel

[ [30] Foreign Application Priority Data

Dec. 1, 1975 United Kingdom......49299/75]

Signed and Sealed this

Twelfth Day of September 1978

[SEAL]

Attest:

RUTH C. MASON
Attesting Officer

DONALD W. BANNER
Commissioner of Patents and Trademarks